UNITED STATES PATENT OFFICE.

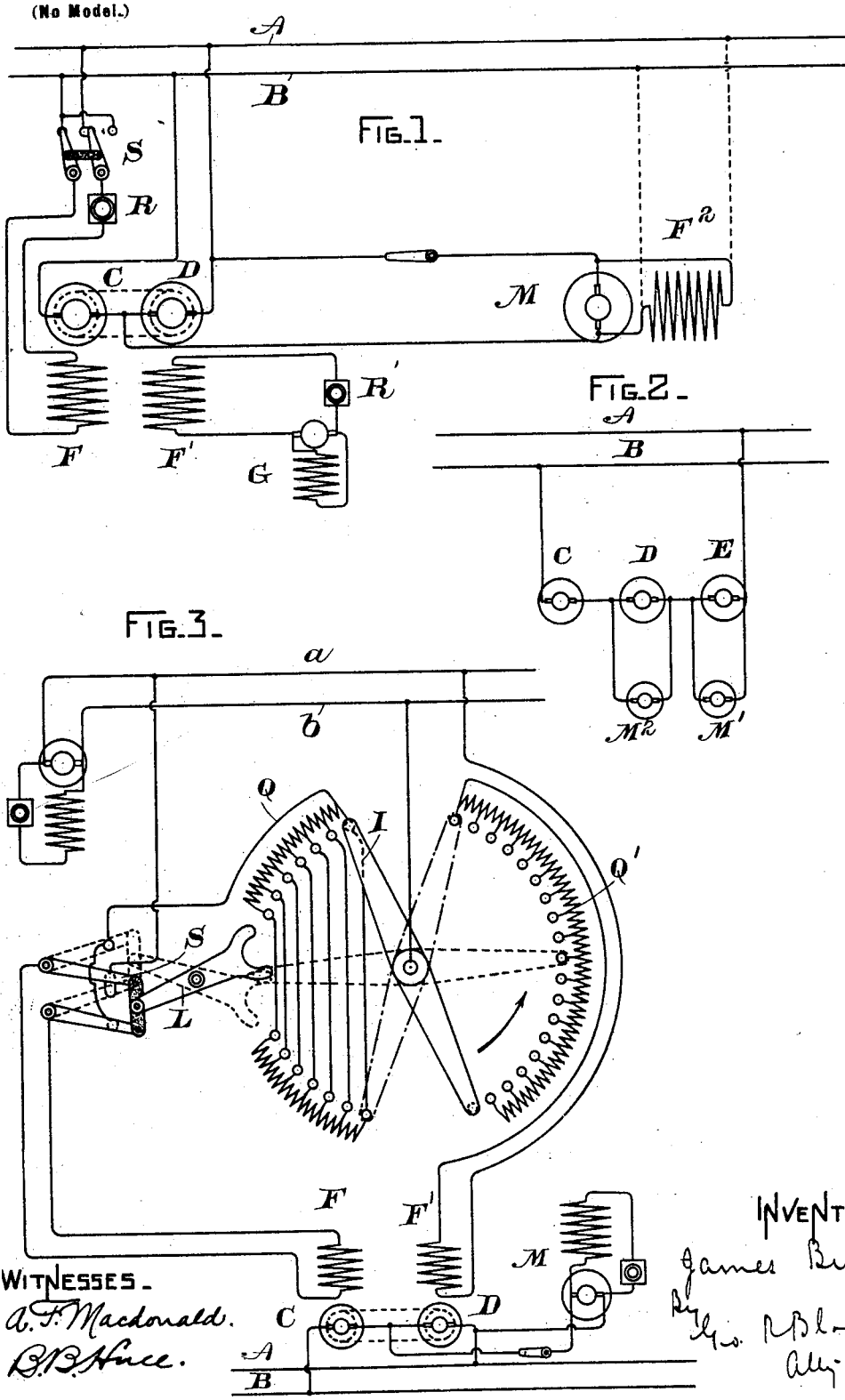

JAMES BURKE, OF NEW YORK, N. Y., ASSIGNOR, BY MESNE ASSIGNMENTS, TO H. WARD LEONARD, OF SAME PLACE.

REGULATION AND CONTROL OF ELECTRIC MOTORS.

SPECIFICATION forming part of Letters Patent No. 673,239, dated April 30, 1901.

Application filed March 22, 1895. Serial No. 542,738. (No model.)

*To all whom it may concern:*

Be it known that I, JAMES BURKE, a subject of the Queen of Great Britain, residing at New York, county and State of New York, have invented certain new and useful Improvements in the Regulation and Control of Electric Motors and Consumption-Circuits, of which the following is a specification.

The present invention relates to a certain novel arrangement for regulating electric motors or consumption-circuits and is illustrated in the accompanying drawings, wherein—

Figure 1 shows the general arrangement of connections; Fig. 2, a modification of the same, and Fig. 3 a preferred arrangement for controlling the fields of the regulating-machines.

In the drawings, A B are the mains of an electric circuit supplied with current at constant potential in any of the ordinary ways and from which one or more motors M are to be operated. The regulation of the speed of the motor or motors is effected by varying the voltage applied to the motor or motors. This varying of the voltage is accomplished by means of two regulating dynamo-machines C D, which have their armatures coupled together mechanically, such as by direct coupling, belting, or gearing, so as to run in unison. These armatures need not necessarily run at the same speed. The connections of the electrical circuits are made, as shown in Fig. 1, so that when the circuit of M is open the two machines C D run in series as motors.

The fields of the two machines C D are excited by any suitable means, such as separately or from the mains A B and arranged so that they can be varied—that is, so that one can be increased and the other decreased, or vice versa, either independently or in unison. The field of the machine C is arranged so that it can be reversed and increased in the opposite direction. For illustration the field-coils F of the machine C are shown connected to the mains through a rheostat R and an ordinary reversing-switch S. The field-coils F' of the machine D are supplied with current from a separate exciter G, including in the circuit a rheostat R'. As already pointed out, however, the fields of the machines may be excited in any convenient and suitable manner.

The motor M, as will be seen from Fig. 1, has one terminal connected to the junction of the two machines C D and the other terminal connected to one of the mains A. This motor can have its field excited by any of the ordinary methods, such as shunt, series, or separately excited. A shunt field-coil $F^2$ is shown in full lines, and in dotted lines the coil is connected to the mains A B.

Describing now the mode of operation of the invention, the two machines C D are connected across the mains, as shown in Fig. 1, and run as motors free. The sum of the voltages on C and D is then equal to the voltage across the mains A B; but the division of this voltage between the machines C and D is controlled by the relative field strengths in these two machines. The field on D is now reduced to a minimum and the field on C is at a maximum. The voltage on D is then at a minimum value and practically at zero. The motor-circuit M, which is connected across D, can now be closed and current at low voltage will flow through the motor M due to the small voltage across D. The field on D is now increased and the field on C decreased until the field on C is at a minimum value. The voltage on C becomes then a minimum and on D and the motor M nearly equal to that on the mains A B. The difference between the voltage on the mains and that on D and motor M under this condition is due to the drop across C and the connecting-lines. The field of C is now reversed and gradually increased in this reversed direction. C has now become a generator, and the voltage on M and on D becomes equal to the voltage across the mains A B plus the voltage across C if the drop in the wiring is neglected. It will be seen that the voltage on the motor M has been varied and controlled over a very wide range, and this produces the variation and the control of the speed of the motor from rest to its maximum value.

The main stages that are gone through in bringing the motor up from rest to its maximum speed are as follows:

First. C and D run as motors in series. Motor-circuit M is open. Voltage across D is reduced to a minimum. Voltage across C is at a maximum, the machine running as a motor and developing a counter electromotive force in the circuit of motor M.

Second. Motor-circuit M is closed and D becomes a generator, feeding current into M. C runs as a motor in series with M, thereby dropping the potential from that of the line to that of D and M. The power delivered by C is used in running D as a generator under this condition.

Third. C remains a motor, but running at a very low voltage, and D becomes a motor running free and in multiple with M.

Fourth. The field of C is being reversed. C is therefore neither motor nor generator. D is running free as a motor and in multiple with motor M.

Fifth. C becomes a generator running in series with the voltage across A B. D runs as a motor delivering power to C, which is now a generator. The voltage on D and on motor M is equal to the voltage across the mains A B plus the voltage on C if the drop in connections and wiring is neglected.

The fields of the machines C D can be controlled and regulated by means of rheostats and switches in various manners. One method is shown in Fig. 3. Q Q' are adjustable resistances connected at intervals to contacts, as shown. S is a reversing-switch in the circuit of the field-winding F of machine C and operated by the regulator-arm I through the pivoted rocking link L. The exciting-circuit $a\,b$ may be derived from the supply-mains or fed from any convenient local source. Conductor $b$ is connected to the arm I, and conductor $a$ is connected to the field-coils of the exciting-machines through the resistance, as shown. When the regulator-arm I is in the position, (shown in full lines,) the field F is at its maximum and the field F' is broken. As the arm I is moved around in the direction of the arrow resistance is thrown into the circuit of field F and gradually increased, while the circuit of field F' is closed with the full resistance in circuit and which is simultaneously and gradually reduced. When the arm I reaches the central position, (shown in dotted lines,) the circuit of field F is broken at the rheostat. When it is moved farther around, field F is reversed with the full resistance in circuit, and as the arm I is moved farther around the resistance in both field-circuits is gradually reduced, and when the arm reaches the final position (shown in dotted lines) both fields will have their maximum strength. Additional control of the speed can be made by varying the field of motor M.

The foregoing mode of regulation can be applied by using more than two regulating dynamo-machines C D, coupled up in a similar manner. Thus in Fig. 2 three machines C, D, and E are shown connected in series across the circuit A B. The motor M or any device or circuit can be connected in this arrangement, either across C or across D or across E or across C plus D or across D plus E, or some motors can be connected across each of the above-mentioned machines, where peculiar conditions of regulation are required. I have shown a motor M' connected across the machine E and a second $M^2$ connected across D.

I do not in this case claim the combination, with an electric motor, of a counter-electromotive-force regulator consisting of a second dynamo-electric machine whose armature is in series with the motor to be regulated and independent means for varying the counter electromotive force of the said second dynamo-electric machine; nor do I claim the combination of an electric motor and an electromotive-force regulator consisting of a dynamo whose armature is in series with the armature of the motor and means for varying and reversing the electromotive force of the dynamo to regulate the motor, as these claims are broader than my invention.

What I claim is—

1. The combination of a motor, as M, operated from a constant-potential circuit, and means for regulating the motor consisting of a pair or more of dynamo-machines having their armatures connected across the circuit-mains and mechanically coupled together, with means for simultaneously controlling their fields so as to increase the electromotive force of one machine and correspondingly decrease the electromotive force of a second machine, motor M being connected at an intermediate point between the regulating dynamo-machines.

2. The combination of a constant-potential circuit, a pair of mechanically-connected regulating dynamo-machines coupled across the supply-circuit, a consumption-circuit connected across one of the regulating-machines, means for regulating the field strength of the regulating-machines and means for reversing the field of at least one such machine.

3. The combination of a motor, as M, operating from a constant-potential circuit, with a pair of regulating dynamo-machines, across one of which the motor is connected, with a controlling-switch arranged to successively weaken the field of the regulating-machine in series with the motor, while strengthening that of the machine in multiple with the motor, then to reverse, and after reversing to strengthen the field of the first machine while continuing to strengthen the field of the second machine.

4. The combination of a source of electric energy, two electromotive-force-producing windings connected in series with said source, a consumption-circuit connected across one of said windings, means for regulating the electromotive force of said windings, and means for reversing the electromotive force of one of said windings.

5. The combination of a source of electric energy, two electromotive-force-producing windings connected in series with said source, a consumption-circuit extending across one of said windings, means for simultaneously regulating the electromotive force of said windings, and means for reversing the electromotive force of one of said windings, substantially as set forth.

6. The combination of a source of electric energy, two electromotive-force-producing windings connected in series with said source, a consumption-circuit extending across one of said windings, means for simultaneously and inversely varying the electromotive force of said windings, and means for reversing the electromotive force of one of said windings, substantially as set forth.

7. The combination of a source of electric energy, two electromotive-force-producing windings connected in series with said source, a consumption-circuit extending across one of said windings, and means for simultaneously regulating or controlling the electromotive force of said windings, said means comprising a rheostat and reversing-switch, whereby the electromotive forces of said windings are first simultaneously and inversely varied by the rheostat, and then the electromotive force of one of said windings reversed by the reversing-switch through the operation of the rheostat, substantially as set forth.

8. The combination of a source of electric energy, a pair of regulating dynamo-electric machines connected in series with the source, a consumption-circuit connected across one of the regulating-machines, means for regulating the field strength of the regulating-machines, and means for reversing the field of at least one of said machines, substantially as set forth.

9. The combination of a source of electric energy, a pair of regulating dynamo-electric machines connected in series with the source, a consumption-circuit connected across one of the regulating-machines, and a reversing-rheostat for regulating the field strength of the regulating-machines and for reversing the field of at least one of said machines.

10. The combination of a source of electric energy, a pair of regulating dynamo-electric machines connected in series with the source, a consumption-circuit connected across one of the regulating-machines, means for simultaneously regulating the field strength of the regulating-machines and means for reversing the field of at least one of said machines.

11. The combination of a source of electric energy, a pair of regulating dynamo-electric machines connected in series with the source, a consumption-circuit connected across one of the regulating-machines, and means for simultaneously and inversely varying the field strength of the two machines, and a reversing-switch for the field-circuit of one of said machines.

12. The combination of a source of electric energy, a pair of regulating dynamo-electric machines connected in series with the source, a consumption-circuit connected across one of the regulating-machines, and means for simultaneously regulating or controlling the field strength of said machines, said means comprising a rheostat and reversing-switch, whereby the fields of the two machines are first simultaneously and inversely varied by the rheostat, then the field of one machine reversed by the switch through the operation of the rheostat, and then the field strengths of the two machines simultaneously increased.

13. The combination of a supply-circuit, an electric motor whose armature is connected therewith, two electromotive-force-producing windings, one receiving electric energy from the source, and the other delivering electric energy to the motor-armature, said windings being connected both with the source and with the motor-armature, and means for varying the relative values of the electric energy delivered to the motor-armature by the supply-circuit and the said energy-producing winding.

In witness whereof I have hereunto set my hand this 12th day of March, 1895.

JAMES BURKE.

Witnesses:
C. E. HEWITT,
C. F. MORROW.